Jan. 14, 1936.         J. A. C. KING         2,027,985
SIGNAL INDICATOR FOR RAILROAD VEHICLES
Filed Feb. 23, 1934      3 Sheets-Sheet 1
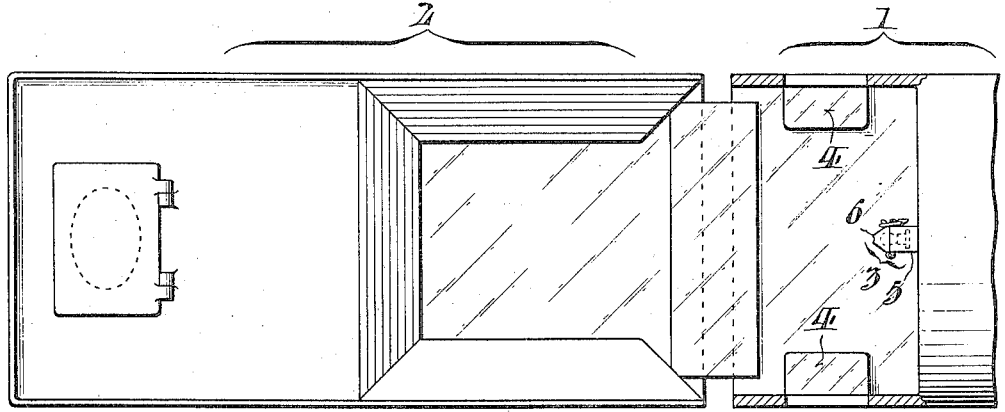
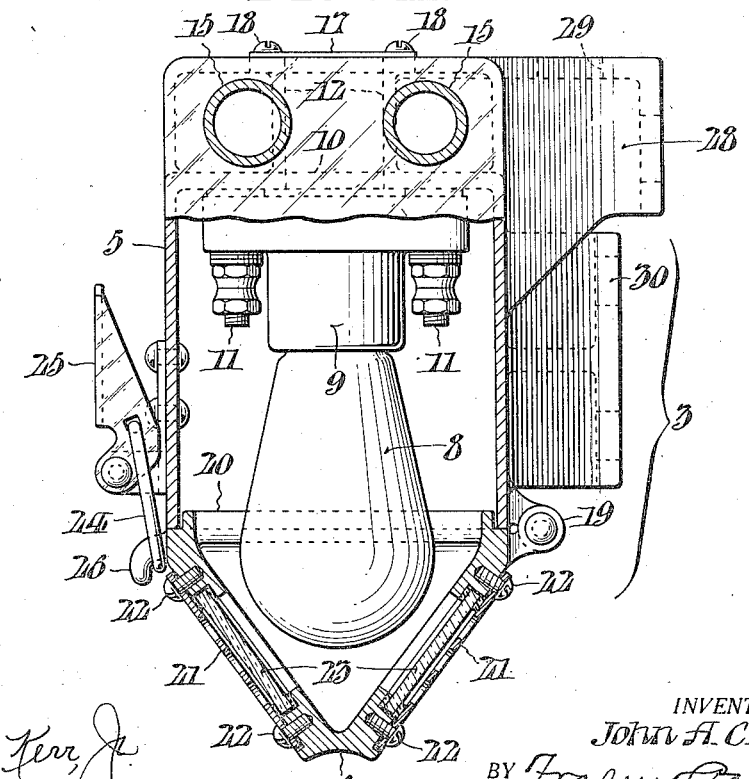

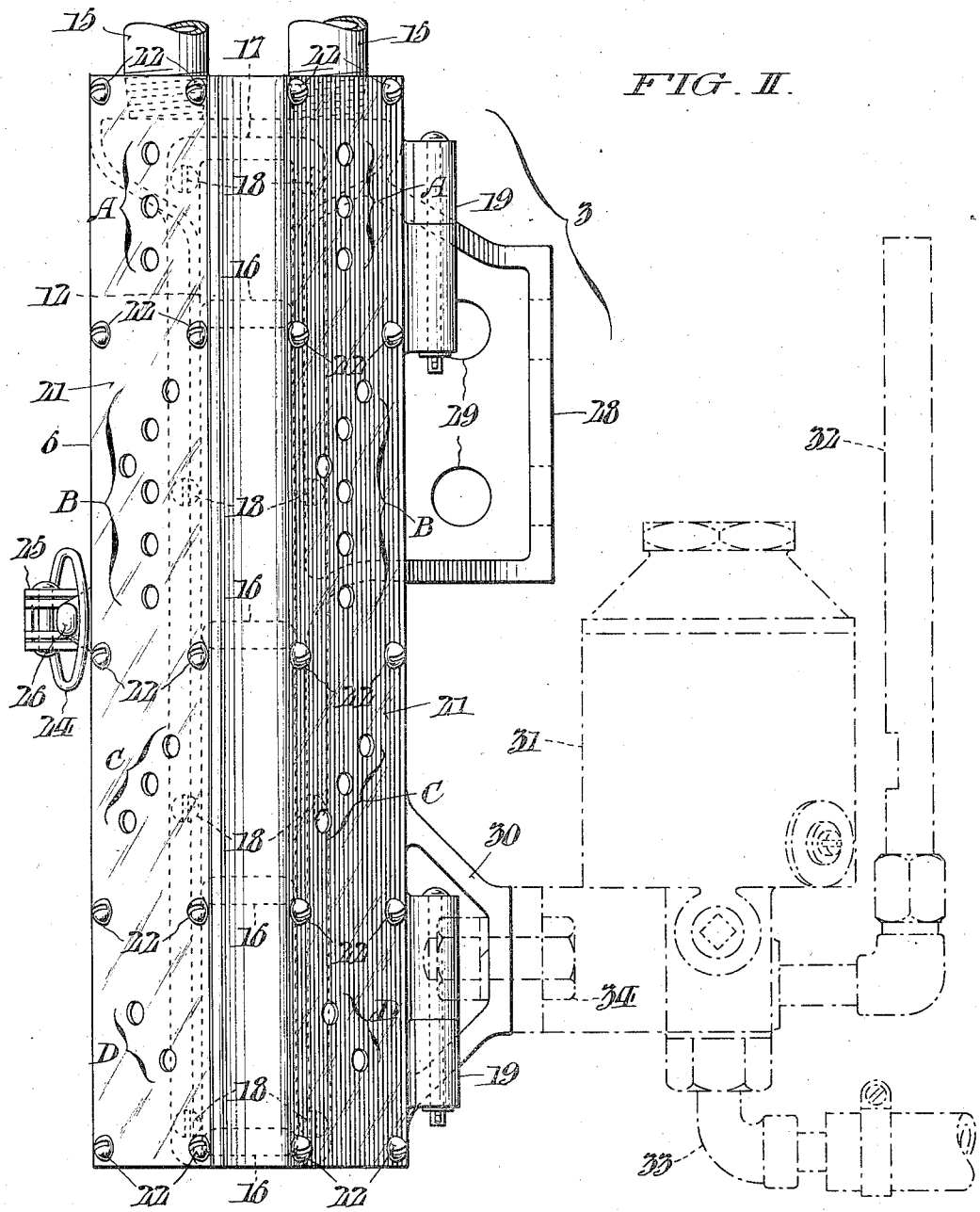

Jan. 14, 1936.   J. A. C. KING   2,027,985
SIGNAL INDICATOR FOR RAILROAD VEHICLES
Filed Feb. 23, 1934   3 Sheets-Sheet 3
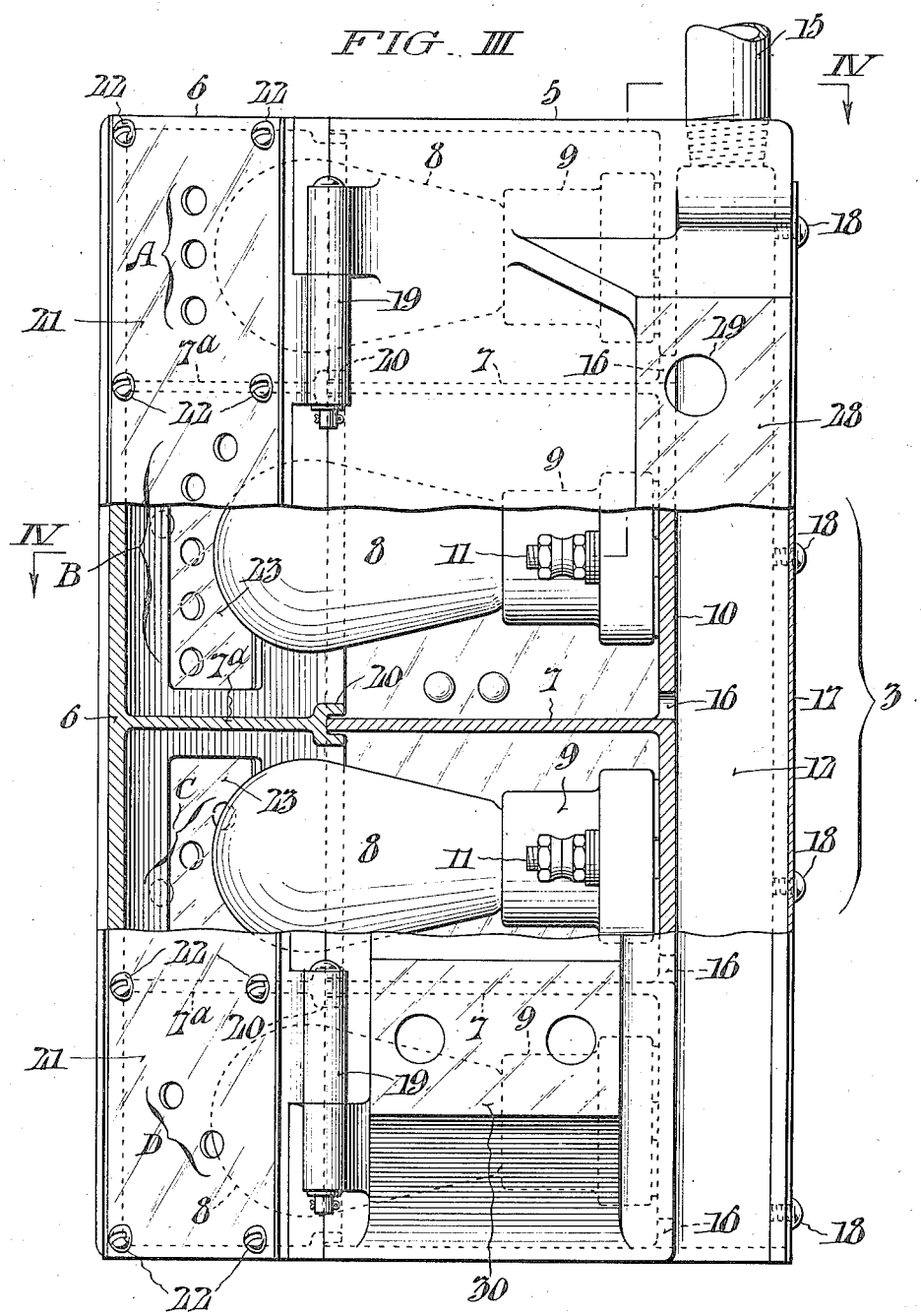

Patented Jan. 14, 1936

2,027,985

UNITED STATES PATENT OFFICE 2,027,985

SIGNAL INDICATOR FOR RAILROAD VEHICLES

John A. C. King, Lansdowne, Pa.

Application February 23, 1934, Serial No. 712,583

3 Claims. (Cl. 246—191)

My invention relates to signal indicators for railroad vehicles and more particularly to indicators of the type used with inductive code signal systems for the purpose of displaying to the train operators within a locomotive cab, or elsewhere within a railroad vehicle, an indication of the condition of the trackway in advance.

Heretofore it has been customary to employ a number of signal indicators at different locations within the vehicle from which the train is controlled. In locomotives, for example, there is usually one indicator placed forward of the fireman's seat on the one side, and an additional indicator placed forward of the engineman's seat on the other side.

One object of my invention is to provide an indicator which is so designed that when placed near the longitudinal center line of the vehicle, the illuminated symbols thereon will be clearly visible to persons at the sides of the vehicle or to the rear of the indicator, thereby making it possible to utilize only one indicator where two have formerly been required.

A more specific object of the invention is to provide an indicator having a special form of V-shaped cover which renders the groups of symbols thereon, representing different signal indications, clearly visible to the train operators at each side, and with the groups of symbols clearly distinguishable from each other, so that there is no likelihood of confusion as to the visual impression conveyed to the train operators.

Another object of the invention is to provide a signal indicator which is capable of ready removal from one vehicle to another, and which may have audible indicating apparatus, such as a magnet valve and whistle attached thereto, the entire apparatus constituting a portable unit.

Other objects and advantages characterizing my invention will become more fully apparent from the description hereinafter set forth of one embodiment or example of the invention, having reference to the accompanying drawings.

Of the drawings:

Fig. I represents somewhat diagrammatically a plan view of the interior of a locomotive cab and tender equipped with a signal indicator of my invention.

Fig. II represents a rear view of the indicator with a magnet valve and whistle attached thereto as shown in dot-and-dash lines.

Fig. III represents a side elevation of the indicator with portions removed to show the interior construction thereof; and, Fig. IV represents a top plan view of the indicator with a portion thereof shown in cross section, taken as indicated by the lines IV—IV of Fig. III.

In the drawings I have shown an example of my invention as applied to a steam locomotive, though it will be apparent that the invention is applicable also to electric locomotives, passenger cars, and other railroad vehicles. The locomotive is designated at 1, and its tender at 2. The indicator, which is comprehensively designated at 3, is disposed near the longitudinal center line of the locomotive 1 in advance of the cab seats 4 for the engineman and fireman. From the description which follows, it will be apparent that the indicator 3 is clearly visible from substantially all parts of the locomotive cab and tender.

With reference to Figs. II and III, it will be observed that in the illustrated example of my invention the indicator 3 is of the four-indication, position-light type. However, the invention is also applicable to indicators having any number of indications and any variety of symbols or colors for representing such indications. The indicator, as illustrated, comprises a box-shaped casing 5 with imperforate walls and a hinged cover 6 thereon.

As most clearly shown in Fig. III, the casing 5 is divided by horizontal partitions 7 into four separate compartments, each adapted to accommodate a lamp 8. Sockets 9 of a well-known type are secured to the vertical wall 10 of the casing 5, and accommodate the lamps 8. Each socket 9 is provided with terminal posts 11 to which the electric wires for carrying the current for illuminating the lamps are attached. At the forward end of the casing 5 (the direction "forward" being used throughout this specification with reference to the normal direction in which the locomotive travels), a vertical conduit 12 is provided. Tubular ducts 15 lead to the top of the conduit 12. In an obvious manner electric wires (not shown) for the lamps 8 may be led through the tubular ducts 15, the conduit 12, and the small passages 16, associated with each lamp compartment, to the terminal posts 11 of the lamp sockets 9. At the forward end of the casing 5 a removable plate 17 is preferably provided, the plate 17 being held in place by screws 18 and being readily removable to permit access to the vertical conduits 12.

The cover 6 for the indicator is of V-shaped formation, pointing rearwardly, and is connected to the casing 5 by hinges 19. Horizontal partitions 7a divide the cover 6 into a series of compartments corresponding to the division of the casing 5 by the partitions 7. The partitions 7a of the cover 6 are desirably formed with bifurcated ends 20 which interlock with the edges of the partitions 7, thereby sealing each lamp compartment with respect to the adjacent lamp compartment against the admission of light.

Each side of the V-shaped cover 6 has transparent symbols thereon representing different signal indications. In the illustrated example the sides of the cover 6 are fitted with plates 21 having separate groups of apertures thereon, there being one group corresponding to each lamp compartment. Corresponding to the uppermost lamp compartment there is a vertical row of apertures A, which when illuminated represent the indication "clear". Corresponding to the second lamp compartment from the top, there is a combined diagonal and vertical row of apertures B which represent the indication "approach restricting". Corresponding to the third lamp compartment from the top, there is a diagonal row of three apertures C representing the indication "approach". Corresponding to the lowermost lamp compartment, there is an oppositely inclined diagonal row of two apertures D representing the indication "caution slow speed."

The apertured plates 21 are preferably secured in place by screws 22 and backed with glass panes 23. It will be observed that the V-shaped cover 6 substantially envelops the ends of the lamps 8, which are in such proximity to the apertured plates 21 that no difficulty is experienced on the part of the operators in distinguishing the illuminated group of apertures from the non-illuminated groups. The hinged cover 6 is securely fastened to the casing 5 by a conventional door fastener comprising a ring 24 carried on a pivoted latch member 25. The cover is provided at its free end with a hook 26 which is engaged by the ring 24 when the cover is latched.

As shown in Fig. II, the indicator 3 is of a portable nature and is adapted to be secured to the vehicle by means of an integral bracket 28 having holes 29 for the insertion of bolts or the like. An additional bracket 30, similarly formed as an integral part of the casing 5, is used for the attachment of audible signal indicating apparatus. As represented by the dot-and-dash lines, the audible apparatus may consist of a magnet valve 31, a whistle 32 and a pipe connection 33. Where it is desired to use a magnet valve and whistle, or other apparatus in the nature of an audible alarm or signal acknowledger, in addition to the visible indications, it is a simple matter to attach this apparatus by means of a bolt 34 passing through the bracket 30.

It is particularly to be observed that with the use of an indicator as shown and described herein, the indications are visible from substantially all points occupied by the train operators, and there is no danger of the operators being confused as to which group of symbols is illuminated. Whether the train operator be positioned at one of the cab seats 4, or standing in some part of the tender 2, his view of the indicator is not only not impaired, but his line of sight passes through the V-shaped cover 6 and into the illuminated lamp within it. The indicator of this invention is thus designed to accomplish what heretofore, as far as I am aware, has only been accomplished by two or more indicators.

While I have described my invention with reference to a particular type of indicator especially useful in a code signal system, and illustrated as adapted to a locomotive, it will be apparent that the indicator of my invention may take many forms and that it may be used in all railroad vehicles from which the train control is effected, without departing from the spirit of my invention as defined in the annexed claims.

Having thus described my invention, I claim:

1. In a railroad vehicle, a signal indicator comprising an integrally cast casing divided by horizontal partitions into a series of compartments, a lamp positioned within each compartment, and a hinged V-shaped cover thereon pointing rearwardly and divided by horizontal partitions into a corresponding series of compartments, each side of said cover having groups of transparent symbols thereon, there being one such group for each compartment, and said casing being disposed near the longitudinal center line of the vehicle.

2. In a railroad vehicle, a signal indicator comprising an integrally cast casing divided by horizontal partitions into a series of compartments, each fitted with a lamp socket, and formed at the front end with a conduit extending vertically throughout the casing and having passages leading to each said compartment, said conduit and passages serving to accommodate wires for said lamp sockets, and a hinged V-shaped cover on said casing pointing rearwardly and divided by horizontal partitions into a corresponding series of compartments, each side of said cover having transparent symbols thereon representing signal indications, there being one such indication for each compartment.

3. In a railroad vehicle a signal indicator having an integrally cast metal casing divided by transverse partitions into a series of compartments, lamps positioned in the casing between the partitions, a hinged integrally cast metal V-shaped cover having integral partitions to correspond with the partitions first mentioned, said corresponding partitions in the cover and casing fitting together by a tongue and groove joint whereby each compartment has a light-proof separation from adjoining compartments, and signal apertures formed on each face of said cover at each compartment.

JOHN A. C. KING.